(12) United States Patent
Han et al.

(10) Patent No.: US 8,554,034 B2
(45) Date of Patent: Oct. 8, 2013

(54) OPTICAL-ELECTRICAL HYBRID TRANSMISSION CABLE

(75) Inventors: Wen-Du Han, Kunshan (CN); Wei Yao, Kunshan (CN); Pei Tsao, La Harbra, CA (US)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 412 days.

(21) Appl. No.: 12/830,460

(22) Filed: Jul. 6, 2010

(65) Prior Publication Data

US 2012/0008904 A1 Jan. 12, 2012

(51) Int. Cl.
*G02B 6/44* (2006.01)

(52) U.S. Cl.
USPC .............................. 385/101; 385/110; 385/113

(58) Field of Classification Search
None
See application file for complete search history.

(56) References Cited

U.S. PATENT DOCUMENTS

| | | | | |
|---|---|---|---|---|
| 5,745,627 | A * | 4/1998 | Arroyo et al. | 385/101 |
| 6,317,541 | B1 * | 11/2001 | Davidson | 385/102 |
| 6,463,198 | B1 * | 10/2002 | Coleman et al. | 385/101 |
| 6,600,108 | B1 * | 7/2003 | Mydur et al. | 174/120 R |
| 6,738,547 | B2 | 5/2004 | Spooner | |
| 6,967,584 | B2 | 11/2005 | Maki | |
| 7,200,305 | B2 * | 4/2007 | Dion et al. | 385/101 |
| 7,643,713 | B2 | 1/2010 | Buthe et al. | |

* cited by examiner

*Primary Examiner* — Tina Wong
(74) *Attorney, Agent, or Firm* — Wei Te Chung; Ming Chieh Chang

(57) ABSTRACT

An optical-electrical hybrid transmission cable (100), comprises an insulative layer (2); a shielding layer located on an inner side of the insulative layer; an optical cable (5) disposed in the shielding layer and comprising two optical fibers (51) and an insulative sheath (52) enclosing the two optical fibers; a pair of signal wires (6) twisted together and disposed in the shielding layer; and a pair of power wires disposed in the shielding layer. And the optical cable, the pair of signal wires and the pair of power wires are arranged along a circumferential direction.

15 Claims, 1 Drawing Sheet

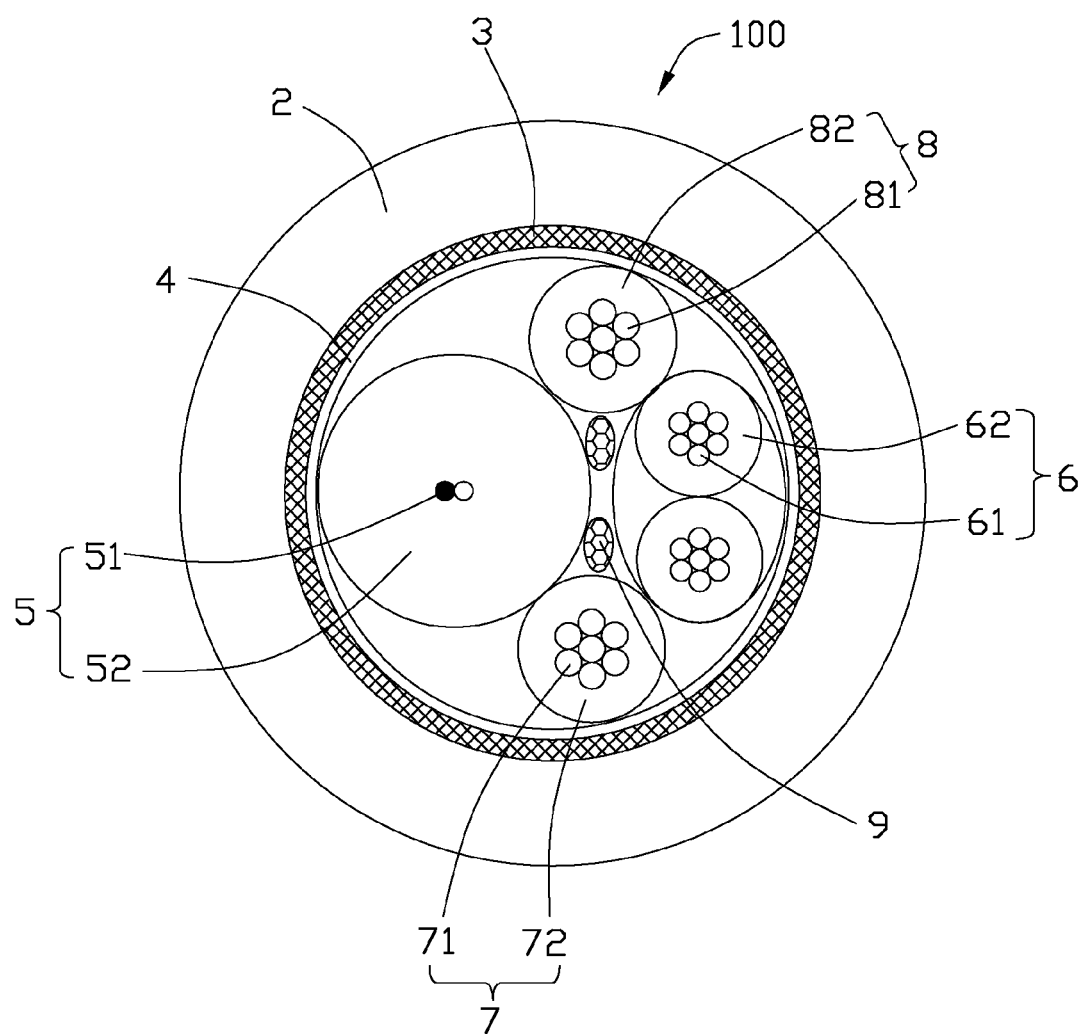

OPTICAL-ELECTRICAL HYBRID TRANSMISSION CABLE

FIELD OF THE INVENTION

The present invention relates to a cable, and more particularly to an optical-electrical hybrid transmission cable.

DESCRIPTION OF PRIOR ART

Recently, as the data transmitting rate between the PC and PC or PC and external electrical device is required faster and faster, the traditional cable connecting with the PC and PC or PC and external device can not meet the high data transmitting rate requirements.

As discussed above, an improved optical-electrical hybrid transmission cable overcoming the shortages of existing technology is needed.

SUMMARY OF THE INVENTION

Accordingly, an object of the present invention is to provide optical-electrical hybrid transmission cable with high speed signals transmission.

In order to achieve the above-mentioned objects, an optical-electrical hybrid transmission cable, comprises an insulative layer; a shielding layer located on an inner side of the insulative layer; an optical cable disposed in the shielding layer and comprising two optical fibers and an insulative sheath enclosing the two optical fibers; a pair of signal wires twisted together and disposed in the shielding layer; and a pair of power wires disposed in the shielding layer. The optical cable, the pair of signal wires and the pair of power wires are arranged along a circumferential direction.

Other objects, features and advantages of the invention will be apparent from the following detailed description taken in connection with the accompanying drawings.

BRIEF DESCRIPTION OF THE DRAWINGS

FIG. 1 is a cross-section view of an optical-electrical hybrid transmission cable in accordance with the present invention.

DETAILED DESCRIPTION OF PREFERRED EMBODIMENTS

Reference will now be made to the drawing figures to describe the present invention in detail.

Referring to FIG. 1, an optical-electrical hybrid transmission cable 100 in accordance with the present invention comprises an insulative layer 2 and a shielding layer from outside to inside, and an optical cable 5, a pair of signal wires 6 twisted together, a pair of power wires 7, 8 disposed in the shielding layer and arranged along a circumferential direction. The optical-electrical hybrid transmission cable 100 further comprises center filled material 9 located between the optical cable 5, the pair of signal wires 6 and the pair of power wires 7, 8. It should be noted that the shielding layer comprises a metallic braided layer 3 and a metallic mylar layer 4 from outside to inside.

The metallic mylar layer 4 is made of aluminum foil and surrounds the optical cable 5, the pair of signal wires 6 and the pair of power wires 7, 8. The metallic mylar layer 4 is to protect the signal transmission of the optical-electrical hybrid transmission 100 from external electromagnetic interference, but also to prevent the optical-electrical hybrid transmission cable 100 from radiating to the exterior.

The metallic braided layer 3 is made of copper and encloses the metallic mylar layer 4 and further protect the signal transmission of the optical-electrical hybrid transmission cable 100 from external electromagnetic interference, but also to prevent the optical-electrical hybrid transmission cable 100 from radiating to the exterior.

The optical cable 5 comprises two optical fibers 51 arranged side by side and an insulative sheath 52 enclosing two optical fibers 51. The optical cable 5 is used for optical signal transmission.

A pair of signal wires 6 is a twisted-pair, in this embodiment, the pair of signal wires 6 are UTP (Unshielded Twisted Paired) wires. Each signal wire 6 has a plurality of copper wires 61 stranded with one another and an insulation 62 enclosing the plurality of copper wires 61.

The pair of power wires includes a power wire 7 and a grounding wire 8 spaced apart with each other by the filled material 9 and the pair of signal wires 6. The power wire 7 defines a plurality of copper wires 71 stranded together and an insulation 72 enclosing the plurality of copper wires 71. The grounding wire 8 also defines a plurality of copper wires 81 stranded together and an insulation 82 enclosing the plurality of copper wires 81. The power wire 7, grounding wire 8 and the pair of signal wires 6 are all used for electrical signal transmission. The optical cable 5 and the pair of signal wires 6 are spaced with each other by the filled material 9. The optical cable 5 has a diameter larger than that of each signal wire 6 and each power wire 7, 8. The pair of power wires and the optical cable 5 are used for electrical signal transmission.

The filled material 9 is formed by two strand fibers, in this embodiment, the filled material 9 is made of Kevlar material. The filled material 9 has a high tensile strength being disposed in the optical-electrical hybrid transmission cable 100. The filled material 9 is surrounded by the optical cable 5, the pair of signal wires 6 and the pair of power wires 7, 8. The filled material 9 also can keep a roundness of the optical-electrical hybrid transmission cable 100.

As the optical-electrical hybrid transmission cable 100 transmitting not only electrical signal but also optical signal, so the data transmitting speed of the optical-electrical hybrid transmission cable 100 is higher than the cable only transmitting electrical signal. So, the optical-electrical hybrid transmission cable 100 can meet the high data transmitting rate requirements between the PC and PC or PC and PC and external device.

It will be understood that the invention may be embodied in other specific forms without departing from the spirit or central characteristics thereof. The present examples and embodiments, therefore, are to be considered in all respects as illustrative and not restrictive, and the invention is not to be limited to the details given herein.

What is claimed is:

1. An optical-electrical hybrid transmission cable, comprising:
   an insulative layer;
   a shielding layer located on an inner side of the insulative layer;
   an optical cable disposed in the shielding layer and comprising two optical fibers and an insulative sheath enclosing the two optical fibers;
   a pair of signal wires twisted together and disposed in the shielding layer;
   a pair of power wires disposed in the shielding layer; and
   filled material disposed in the shielding layer;

wherein the optical cable, the pair of signal wires and the pair of power wires are arranged along a circumferential direction;

wherein the shielding layer comprises a metallic braided layer disposed on an inner side of the insulative layer and a metallic mylar layer disposed on an inner side of the metallic braided layer;

wherein the filled material is formed by strand Kevlar fibers and surrounded by the optical cable, the pair of signal wires and the pair of power wires.

2. The optical-electrical hybrid transmission cable as recited in claim 1, wherein the two fibers of the optical cable are arranged side by side, the optical cable is disposed in the metallic mylar layer.

3. The optical-electrical hybrid transmission cable as recited in claim 1, wherein the pair of signal wires are unshielded twisted paired wires and used for transmitting differential signal.

4. The optical-electrical hybrid transmission cable as recited in claim 1, wherein the optical cable is used for optical signal transmission, the pair of signal wires and the pair of power wires are used for electrical signal transmission.

5. The optical-electrical hybrid transmission cable as recited in claim 1, wherein the pair of power wires comprises a power wire and a grounding wire spaced apart with the power wire by the pair of signal wires.

6. The optical-electrical hybrid transmission cable as recited in claim 1, the pair of signal wires are spaced apart with the optical cable by the filled material.

7. The optical-electrical hybrid transmission cable as recited in claim 1, the optical cable has a diameter larger than that of each signal wire, the power wire and the grounding wire.

8. A hybrid cable comprising:

an inner segment, a middle segment and an outer segment sequentially coaxially arranged with one another in an axial direction wherein said inner segment and said outer segment cooperate with each other to radially sandwich the middle segment therebetween;

the outer segment being of an insulative layer;

the middle segment being of at least one metallic layer; and the inner segment including an optical cable, a plurality of signal wires and a plurality of power wires intimately sidewardly contact one another perpendicular to said axial direction to commonly and cooperatively define an essentially closed type boundary to surround filled material therein.

9. The hybrid cable as claimed in claim 8, wherein the inner segment is essentially symmetrically arranged with regard to an imaginary centerline.

10. The hybrid cable as claimed in claim 9, wherein the signal wires and the power wires are symmetrically arranged by two sides of said imaginary centerline while the optical cable is of a single piece aligned with said centerline.

11. The hybrid cable as claimed in claim 9, wherein the filled material includes two spaced parts symmetrically arranged with regard to the centerline.

12. The hybrid cable as claimed in claim 8, wherein the middle segment includes an inner metallic mylar layer and an outer metallic braided layer.

13. The hybrid cable as claimed in claim 8, wherein the signal wires and the power wires share a same first diameter while the optical cable has a second diameter which is two times of the first diameter.

14. The hybrid cable as claimed in claim 13, wherein there are two signal wires intimately arranged with each other and sheathed together as one piece, and two power wires spaced from each other and respectively contacting two opposite ends of said two sheathed signal wires, and the optical cable contacts said two power wires, respectively, and distantly confronts said two sheathed signal wires with said filled material therebetween.

15. The hybrid cable as claimed in claim 8, wherein the two signal wires and the two power wires are essentially located in one half of a space defined in the middle segment, and the optical cable is located in the other half of said space.

* * * * *